US011781025B2

(12) United States Patent
Tehrani et al.

(10) Patent No.: US 11,781,025 B2
(45) Date of Patent: Oct. 10, 2023

(54) AQUEOUS INKJET INK COMPOSITIONS

(71) Applicant: Xerox Corporation, Norwalk, CT (US)

(72) Inventors: Sepehr M. Tehrani, North York (CA); Syed Mohsin Ali, Milton (CA); Carlos Dondon, Mississauga (CA); Biby Esther Abraham, Mississauga (CA); C. Geoffrey Allen, Waterdown (CA); Mihaela Maria Birau, Hamilton (CA)

(73) Assignee: Xerox Corporation, Norwalk, CT (US)

( * ) Notice: Subject to any disclaimer, the term of this patent is extended or adjusted under 35 U.S.C. 154(b) by 192 days.

(21) Appl. No.: 17/313,097

(22) Filed: May 6, 2021

(65) Prior Publication Data
US 2022/0356360 A1  Nov. 10, 2022

(51) Int. Cl.
*C09D 11/10* (2014.01)
*C09D 11/033* (2014.01)
*C09D 11/037* (2014.01)
*C09D 11/107* (2014.01)
*C09D 11/322* (2014.01)
*C08K 3/22* (2006.01)
*C08K 3/36* (2006.01)

(52) U.S. Cl.
CPC .......... *C09D 11/033* (2013.01); *C09D 11/037* (2013.01); *C09D 11/107* (2013.01); *C09D 11/322* (2013.01); *C08K 3/22* (2013.01); *C08K 3/36* (2013.01); *C08K 2003/2241* (2013.01); *C08K 2201/005* (2013.01); *C08K 2201/011* (2013.01); *C08K 2201/019* (2013.01)

(58) Field of Classification Search
CPC ... C09D 11/033; C09D 11/037; C09D 11/107; C09D 11/322; C09D 11/38; C09D 11/36; C09D 11/10; C08K 3/36; C08K 3/22; C08K 2003/2241; C08K 2201/005; C08K 2201/011; C08K 2201/019
USPC ....................................................... 524/497
See application file for complete search history.

(56) References Cited

U.S. PATENT DOCUMENTS

| | | | |
|---|---|---|---|
| 6,050,680 A | 4/2000 | Moriyama et al. | |
| 6,550,892 B1 | 4/2003 | Sharma | |
| 8,840,211 B2 | 9/2014 | Gargir et al. | |
| 9,371,464 B2 | 6/2016 | Breton et al. | |
| 2006/0038867 A1 | 2/2006 | Valentini | |
| 2008/0186373 A1 | 8/2008 | Rolly | |
| 2009/0318598 A1* | 12/2009 | Perez | C08F 220/1804 524/789 |
| 2011/0007318 A1 | 1/2011 | Okuda et al. | |
| 2011/0184108 A1 | 7/2011 | Okuda et al. | |
| 2011/0318551 A1 | 12/2011 | Nakagawa | |
| 2012/0293578 A1 | 11/2012 | Shiono | |
| 2013/0155160 A1 | 6/2013 | Shiono | |
| 2015/0175824 A1* | 6/2015 | Wolfe | C09D 11/38 106/31.65 |
| 2017/0021641 A1* | 1/2017 | Goi | C09D 11/107 |
| 2019/0218405 A1* | 7/2019 | Seguchi | C09D 11/033 |
| 2019/0284414 A1 | 9/2019 | Bruinsma | |
| 2019/0367753 A1 | 12/2019 | Chopra et al. | |
| 2022/0162462 A1 | 5/2022 | Tehrani et al. | |

FOREIGN PATENT DOCUMENTS

| | | |
|---|---|---|
| EP | 1609827 A1 | 12/2005 |
| EP | 1108758 B1 | 7/2006 |
| EP | 2823002 B1 | 5/2016 |
| EP | 1756237 B1 | 5/2017 |
| EP | 2097265 B1 | 2/2018 |
| EP | 3494182 B1 | 4/2020 |
| JP | 2014/091795 | 5/2014 |
| WO | WO2006/111707 | 10/2006 |
| WO | WO2014/042653 | 3/2014 |
| WO | WO2018/143957 | 8/2018 |
| WO | WO2018/143959 | 8/2018 |
| WO | WO2018/143962 | 8/2018 |

OTHER PUBLICATIONS

Extended European Search Report for EP 22169296 dated Dec. 20, 2022; pp. 1-11.
Canadian Examination Search Report for CA 3,156,651 dated Jul. 5, 2023, pp. 1-5.

* cited by examiner

*Primary Examiner* — Hannah J Pak
(74) *Attorney, Agent, or Firm* — Bell & Manning, LLC

(57) ABSTRACT

Aqueous inkjet ink compositions are provided. In an embodiment, such an aqueous inkjet ink composition comprises a solvent system comprising water, a first organic solvent, and a second organic solvent, wherein the second organic solvent is an alkanediol having from 2 to 8 carbon atoms and the second organic solvent is present at an amount of from greater than 0 weight % to about 8 weight %; a white pigment; and resin particles. Methods of making and using the aqueous inkjet ink compositions are also provided.

17 Claims, No Drawings

AQUEOUS INKJET INK COMPOSITIONS

BACKGROUND

White inks have been added to standard CMYK color sets to improve image quality. White inks also help correct the perceived colors when printing on transparent or off-white substrates. Despite the benefits of including white inks in inkjet color sets, the complexities and challenges in formulating the inks has hindered them from reaching their full potential. One obstacle is early sedimentation of white pigment (generally titanium oxide nanoparticles) and lack of long-term colloidal stability. Titanium oxide nanoparticles (rutile, anatase, or both) have a very high density. In low viscosity mixtures, such as aqueous inkjet ink compositions (generally <10 cP), they sediment quickly. Once sedimentation occurs, gravity creates a compact, cemented residue at the bottom of the container which is generally not dispersible. Sedimentation plugs ink feed tubes, print heads, and nozzles. Sedimentation also leads to short shelf-life and short latency and decap time. Finally, sedimentation reduces the optical density of the printed ink and compromises print opacity.

SUMMARY

The present disclosure provides white and grey aqueous inkjet ink compositions. Embodiments of the aqueous inkjet ink compositions exhibit excellent colloidal stability and jetting performance, extended latency and decap time, and high opacity. They also exhibit excellent coating properties, including uniform film-formation, wetting and spread, as well as durability and water-fastness on a variety of substrates. Methods of forming and using the aqueous inkjet ink compositions are also provided. Aqueous inkjet ink compositions are provided. In an embodiment, such an aqueous inkjet ink composition comprises a solvent system comprising water, a first organic solvent, and a second organic solvent, wherein the second organic solvent is an alkanediol having from 2 to 8 carbon atoms and the second organic solvent is present at an amount of from greater than 0 weight % to about 8 weight %; a white pigment; and resin particles.

Methods of making and using the aqueous inkjet ink compositions are also provided.

Other principal features and advantages of the disclosure will become apparent to those skilled in the art upon review of the following drawings, the detailed description, and the appended claims.

DETAILED DESCRIPTION

The aqueous inkjet ink compositions comprise a solvent system comprising water; a white pigment; and resin particles. Other components may be included, such as a colorant, a wax, and other additives. These components are described in detail below.

Solvent System

As noted above, the aqueous inkjet ink composition comprises water. In embodiments, the amount of water used is in a range of from 40 weight % to 70 weight % as compared to the total weight of the aqueous inkjet ink composition. This includes from 50 weight % to 70 weight %, from 40 weight % to 60 weight %, from 40 weight % to 50 weight %, and from 50 weight % to 60 weight %.

The water is one component of a solvent system also comprising a water-soluble or water-miscible organic solvent. In embodiments, a first such organic solvent is used. The first organic solvent may be a diol. The diol may be an alkanediol having 2, 3, or 4 carbon atoms. The alkane diol may be a branched alkanediol. An illustrative branched alkanediol is propylene glycol. A single type or combinations of different types of the first organic solvent may be used. The total amount of the first organic solvent may be present in the aqueous inkjet ink composition in an amount of from 10 weight % to 40 weight % as compared to the total weight of the aqueous inkjet ink composition. This includes from 15 weight % to 40 weight %, and from 20 weight % to 40 weight %.

In embodiments, the first organic solvent is not a pyrrolidone, e.g., 2-pyrrolidone; dipropylene glycol monomethyl ether; tetrahydrofurfuryl alcohol; or propylene glycol monopropyl ether. In such embodiments, the aqueous inkjet ink composition is free of (i.e., does not comprise) each of these compounds.

In embodiments, a second organic solvent is used in the solvent system. The second organic solvent may also be a diol, but one that is different from the first organic solvent. As shown in the Examples, below, it has been determined that the colloidal stability of the aqueous inkjet ink composition is highly sensitive to the presence of the second organic solvent. In embodiments, the second organic solvent is an alkanediol. The alkanediol may have from 2 to 8 carbon atoms, i.e., 2, 3, 4, 6, 7, or 8 carbon atoms. In embodiments, the alkanediol has more than 4 carbon atoms, e.g., 5, 6, 7, or 8. The alkanediol may be a linear or branched alkanediol. The two hydroxy groups may assume any position on the alkanediol. Illustrative linear alkanediols include the following: ethylene glycol, triethyleneglycol, 1,3-propanediol, 1,2-butanediol, 1,3-butanediol, 1,4-butanediol, 2,3-butanediol, 1,2-pentanediol, 1,3-pentanediol, 1,4-pentanediol, 1,5-pentanediol, 2,4-pentanediol, 1,2-hexanediol, 1,3-hexanediol, 1,6-hexanediol, 2,5-hexanediol, 1,2-heptanediol, 1,3-heptanediol, 1,7-heptanediol, 1,2-octanediol, 1,3-octanediol, 1,5-octanediol, 1,6-octanediol, 1,7-octanediol, 1,8-octanediol, 2,4-octanediol, 1, 3,6-octanediol. Other illustrative alkanediols include 2-methyl-2,4-pentanediol, 3-methyl-1, 5-pentanediol, 2-ethyl-1,3-hexanediol, diethylene glycol, 3-methyl-1,3 butanediol, 2-ethyl-1,3-hexanediol, 2-buyl-2-ethyl-1,3-propanediol, 2,5-dimethyl-hexanediol, and 2,2,4-trimethyl-1,3-pentanediol.

In embodiments, the second organic solvent is a hexanediol, including any of the hexanediols described above. In embodiments, the second organic solvent is 1,2-hexanediol. In embodiments, the second organic solvent is not 1,6-hexanediol. In such embodiments, the aqueous inkjet ink composition is free of (i.e., does not comprise) 1,6-hexanediol.

A single type or combinations of different types of the second organic solvent may be used. The total amount of the second organic solvent may be present in the aqueous inkjet ink composition in an amount of from greater than 0 weight % to 8 weight % as compared to the total weight of the aqueous inkjet ink composition. This includes from greater than 0 weight % to 6 weight %, greater than 0 weight % to 5 weight %, from 2 weight % to 6 weight %, from 3 weight % to 6 weight %, and from 3 weight % to 5 weight %.

In embodiments, the solvent system consists of the water, the first organic solvent, and the second organic solvent. In such embodiments, any of the first and second organic solvents described above may be used. Any of the amounts for the water and the first and second organic solvents described above may be used.

White Pigment

The aqueous inkjet ink composition comprises a white pigment. The white pigment is generally titanium dioxide ($TiO_2$). The crystal structure of the $TiO_2$ may be anatase, rutile, or combinations of different types of crystal structures may be used. Other white pigments may be used, such as zinc oxide (ZnO), zinc sulfide (ZnS), lithopone ($BaSO_4$ and ZnS), alumina hydrate, calcium carbonate ($CaCO_3$), barium sulfate ($BaSO_4$), talc ($Mg_3Si_4O_{10}(OH)_2$), silica ($SiO_2$), and China Clay ($Al_2O_3.2SiO_2.2H_2O$). Combinations of different types of white pigments may be used. However, in embodiments, only $TiO_2$ is used as the white pigment.

The white pigment is generally in the form of particles. The size of the particles may be reported as a $D_{50}$ particle size, which refers to a diameter at which 50% of the sample (on a volume basis) is comprised of particles having a diameter less than said diameter value. In embodiments, the white pigment particles have a $D_{50}$ particle size in a range of from 20 nm to 500 nm. However, in embodiments, relatively small white pigment particles are used, having a $D_{50}$ particle size of less than 150 nm, less than 125 nm, less than 100 nm, including from 20 nm to 80 nm, or from 30 nm to 70 nm. The $D_{50}$ particle size may be measured using a Malvern Zetasizer Nano ZS. For check of light scattering techniques and methods, NIST polystyrene Nanosphere control samples having a diameter within the range of 20 nm to 200 nm available from Microspheres-Nanospheres (a Corpuscular company of Microtrac) or third-party vendors (such as ThermoFisher Scientific) may be used.

Various amounts of white pigment may be used. In embodiments, the white pigment is present at an amount in the range of from 0.1 weight % to 15 weight % as compared to the total weight of the aqueous inkjet ink composition. This includes from 1 weight % to 10 weight % and from 1 weight % to 5 weight %. If more than one type of white pigment is used, these amounts refer to the total amount of white pigment. These amounts refer to solids content as opposed to the amount of a dispersion comprising the white pigment.

Resin Particles

The aqueous inkjet ink composition also comprises resin particles. The resin particles are synthesized from various monomers to form a polymeric material from which the resin particles are composed. The types of monomers, and hence, polymeric material, is not particularly limited. However, by way of illustration, the following monomers and combinations thereof may be used (use of "(meth)" as in, e.g., "(meth)acrylate", refers to both acrylate and methacrylate): styrene; alkyl (meth)acrylates, such as, methyl acrylate, ethyl acrylate, butyl acrylate, isobutyl acrylate, dodecyl acrylate, n-octyl acrylate, 2-chloroethyl acrylate, methyl methacrylate, ethyl methacrylate and butyl methacrylate; β-carboxy ethyl acrylate (β-CEA), phenyl acrylate, methyl alphachloroacrylate; butadiene; isoprene; methacrylonitrile; acrylonitrile; vinyl ethers, such as vinyl methyl ether, vinyl isobutyl ether, and vinyl ethyl ether; vinyl esters, such as vinyl acetate, vinyl propionate, vinyl benzoate and vinyl butyrate; vinyl ketones, such as vinyl methyl ketone, vinyl hexyl ketone and methyl isopropenyl ketone; vinylidene halides, such as vinylidene chloride and vinylidene chlorofluoride; N-vinyl indole; N-vinyl pyrrolidone; methacrylate; acrylamide; methacrylamide; vinylpyridine; vinylpyrrolidone; vinyl-N-methylpyridinium chloride; vinyl naphthalene; p-chlorostyrene; vinyl chloride; vinyl bromide; vinyl fluoride; ethylene; propylene; butylenes; and isobutylene. In embodiments, the monomers used to form the resin particles comprise a styrene and an alkyl acrylate.

Acidic monomers may be used to form the resin particles, including (meth)acrylic acid monomers, sulfonic acid monomers, sulfonate monomers, and combinations thereof. Illustrative acidic monomers include acrylic acid, methacrylic acid, ethacrylic acid, dimethylacrylic acid, maleic anhydride, maleic acid, styrenesulfonic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, and combinations thereof. These acidic monomers also encompass salts thereof, e.g., salt of a sulfonic acid.

Two different acidic monomers may be used to form the resin particles, each having a different $pK_a$ value. This is useful to improve colloidal stability over a wide range of pH and a wide range of pigment grades. The $pK_a$ values of the two different acidic monomers may differ from one another by at least 2 units, at least 3 units, at least 4 units, or at least 5 units. In embodiments, the two different acidic monomers are present in a monomer emulsion used to form the resin particles at a weight ratio in a range of from 0.1 to 10. This includes a range of from 0.5 to 8 and from 1 to 6. In embodiments, the two different types of acidic monomers used to form the resin particles comprise a methacrylic acid and a sulfonic acid.

Hydrophilic monomers may be used to form the resin particles. The term "hydrophilic monomer" is distinguished from the "acidic monomers" described above. That is, although the selected acidic monomers may also be hydrophilic, these terms refer to different, chemically distinct species of monomers. The hydrophilic monomers are generally monofunctional, i.e., comprising a single polymerizable group. Suitable hydrophilic monomers are those capable of absorbing relatively significant amounts of water via hydrogen bonds formed between water and hydrogen bonding moieties of the hydrophilic monomers. Hydroxyl moieties and glycol moieties are illustrative hydrogen bonding moieties. For example, poly(ethylene glycol)- and poly(propylene glycol)-based hydrophilic monomers are particularly useful as the glycol-containing chains are capable of absorbing significant amounts of water. Suitable hydrophilic monomers are also those that polymerize near the surface of the resin particles such that the hydrogen bonding moieties extend from the surface of the resin particles into a surrounding aqueous medium.

As noted above, illustrative hydrophilic monomers include those comprising hydroxyl moieties, such as hydroxyethyl (meth)acrylate, n-hydroxyethyl (meth)acrylamide, hydroxypropyl (metha)crylate, and hydroxypropyl (meth)acrylamide. Other illustrative hydrophilic monomers include those comprising glycol moieties, such as ethylene glycol (meth)acrylate and propylene glycol (meth)acrylate. Poly(ethylene glycol) (meth)acrylate and poly(propylene glycol) (meth)acrylate are other examples. In embodiments, the hydrophilic monomer is poly(ethylene glycol) (meth)acrylate having a molecular weight in a range of from 185 g/mol to 1500 g/mol. This includes a range of from 360 g/mol to 1500 g/mol, and from 500 g/mol to 1000 g/mol. In embodiments, the hydrophilic monomer is poly(propylene glycol) (meth)acrylate having a molecular weight in a range of from 260 g/mol to 1000 g/mol. This includes a range of from 360 g/mol to 1000 g/mol, and from 500 g/mol to 1000 g/mol. Gel permeation chromatography may be used to determine these molecular weights.

Multifunctional monomers may be used to form the resin particles, i.e., those comprising more than one polymerizable group (e.g., 2, 3, 4). These are useful as they facilitate crosslinking within the resin particles. Illustrative multifunctional monomers include difunctional monomers such as a poly(ethylene glycol) di(meth)acrylate, e.g., poly(ethylene glycol) diacrylate having a molecular weight of 250 g/mol. Other poly(ethylene glycol) di(meth)acrylates may be used, including those having a molecular weight in a range of from 214 g/mol to 1000 g/mol, from 214 g/mol to 500 g/mol, and from 214 g/mol to 300 g/mol. These difunctional monomers may also be considered to be hydrophilic as noted above. Again, gel permeation chromatograph may be used to determine these molecular weights. Other hydrophilic difunctional monomers include a diacrylate compound bonded with an alkyl chain containing an ether bond, such as diethylene glycol diacrylate, triethylene glycol diacrylate, tetraethylene glycol diacrylate, polyethylene glycol #400 diacrylate, polyethylene glycol #600 diacrylate, dipropylene glycol diacrylate, and compounds obtained by substituting acrylate of these compounds with methacrylate; a diacrylate compound bonded with a chain containing an aromatic group and an ether bond, such as polyoxyethylene(2)-2,2-bis(4-hydroxyphenyl)propane diacrylate, polyoxyethylene (4)-2,2-bis(4-hydroxyphenyl)propane diacrylate, and compounds obtained by substituting acrylate of these compounds with methacrylate. Other difunctional monomers include a diene compound, such as isoprene and butadiene, an aromatic divinyl compound, such as divinylbenzene and divinylnaphthalene; a diacrylate compound bonded with an alkyl chain, such as ethylene glycol diacrylate, 1,3-butylene glycol diacrylate, 1,4-butanediol diacrylate, 1,5-pentanediol diacrylate, 1,6-hexanediol diacrylate, 1,10-dodecanediol diacrylate, neopentyl glycol diacrylate, and compounds obtained by substituting acrylate of these compounds with methacrylate. Multifunctional monomers include pentaerythritol triacrylate, trimethylolmethane triacrylate, trimethylolpropane triacrylate, tetramethylolmethane tetraacrylate, oligoester acrylate, and compounds obtained by substituting acrylate of these compounds with methacrylate.

Reactive surfactants may be used to form the resin particles. Suitable reactive surfactants comprise a polymerizable (and thus, reactive) group such that they become incorporated into the resin particles. Illustrative reactive surfactants include anionic ether sulfate reactive surfactants such as those in the commercially available Hitenol BC series such as Hitenol BC10-25. Other suitable reactive surfactants include polyoxyethylene alkylphenyl ether ammonium sulfate, Hitenol BC-10, BC-20, BC-2020, BC-30; polyoxyethylene styrenated phenyl ether ammonium sulfate including Hitenol AR-10, AR-20, AR10-25, AR-2020; non-ionic polyoxyethylene alkylphenyl ether including Noigen RN-10, RN-20, RN-30, RN-40, RN-5065; and reactive surfactant available from Ethox including E-sperse RX-201, RX-202, RX-203, RS-1596, RS-1616, RS-1617, RS-1618, RS-1684.

A chain transfer agent may be used to form the resin particles. The chain transfer agent may be a mercaptan or a thiol. Suitable chain transfer agents include n-dodecylmercaptan (NDM), n-dodecanethiol (DDT), tert-dodecylmercaptan, 1-butanethiol, 2-butanethiol, octanethiol, and combinations thereof. Halogenated carbons such as carbon tetrabromide, carbon tetrachloride, and combinations thereof may be used as chain transfer agents.

In forming the resin particles, any of the monomers described above may be used in a monomer emulsion comprising a solvent. Water is generally used as the solvent, but water-soluble or water-miscible organic solvents (e.g., ethanol) may also be included. The type of monomers and their relative amounts may be selected to tune the properties of the resin particles.

Acidic monomers may be used in the monomer emulsion in an amount in a range of from 1.5 weight % to 15 weight %. (Here, weight % refers to the (total weight of acidic monomers)/(total weight of monomers in the monomer emulsion, excluding the reactive surfactants)*100). This range includes from 5 weight % to 10 weight %. As noted above, two different types of acidic monomers having different $pK_a$ values may be used in the weight ratios described above. Hydrophilic monomers may be used in the monomer emulsion an amount in a range of from 1 weight % to 15 weight %. (Weight % has a meaning analogous to that described for acidic monomers.) This range includes from 2 weight % to 15% weight % and from 5 weight % to 15 weight %. Multifunctional monomers, including difunctional monomers, may be used in the monomer emulsion in similar amounts. In embodiments, the amount is in a range of from 0.01 weight % to 0.8 weight %, from 0.03 weight % to 0.3 weight % or from 0.4 weight % to 0.6 weight %. Other monomers, (e.g., styrenes, alkyl (meth)acrylates) may be present in an amount in a range of from 70 weight % to 97 weight %. (Weight % has a meaning analogous to that described for acidic monomers.) This range includes from 75 weight % to 90 weight %.

Together, the amount of acidic monomers, hydrophilic monomers, and multifunctional monomers (e.g., hydrophilic multifunctional monomers) may be present in the monomer emulsion a range of from 10 weight % to 30 weight %. (Here, weight % refers to the (total weight of acidic monomers, hydrophilic monomers, and multifunctional monomers)/(total weight of monomers in the monomer emulsion, excluding the reactive surfactants)*100). This range includes from 15 weight % to 30 weight % and from 15 weight % to 25 weight %.

Reactive surfactants may be used in the monomer emulsion an amount in a range of from 1.5 weight % to 6.5 weight %. (Here, weight % refers to the (total weight of reactive surfactants)/(total weight of monomers in the monomer emulsion, including the reactive surfactant monomers)*100). This range includes from 1.5 weight % to 5 weight %.

The chain transfer agent(s) may be present in the monomer emulsion and may be used in various suitable amounts, for example, from 0.25 weight % to 2.5 weight %. (Here, weight % refers to the (total weight of chain transfer agents)/(total weight of monomers in the monomer emulsion, excluding the reactive surfactants)*100.)

In embodiments, the monomer emulsion comprises (or consists of) a solvent (e.g., water), a styrene, an alkyl acrylate (e.g., butyl acrylate), an acidic monomer, a hydrophilic monomer, a multifunctional (e.g., a difunctional monomer), a reactive surfactant, and a chain transfer agent. In such embodiments, one type or different types of the various monomers may be used. Similarly, one type or different types of the solvent and/or one type or different types of the chain transfer agent may be used. In embodiments, the monomer emulsion comprises (or consists of) a solvent (e.g., water), a styrene, an alkyl acrylate (e.g., butyl acrylate), two different types of acidic monomers (e.g., a methacrylic acid and a sulfonic acid), a hydrophilic monomer (e.g., hydroxyethyl acrylate), a difunctional monomer (e.g., a poly(ethylene glycol) diacrylate), a reactive surfactant, and a chain transfer agent. In any of these embodiments, amounts of the various monomers and chain transfer agents may be used as described above. The balance may be made up of the solvent.

At least in embodiments, the monomer emulsion is free of (i.e., does not comprise) a surfactant. Here, "surfactant" refers to non-reactive, non-polymerizable anionic surfactants such as sodium dodecylsulfate (SDS), sodium dodecylbenzene sulfonate, sodium dodecylnaphthalene sulfate; dialkyl benzenealkyl sulfates; palmitic acid; alkyldiphenyloxide disulfonate; and branched sodium dodecyl benzene sulfonate. "Surfactant" also refers to non-reactive, non-polymerizable cationic surfactants such as alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, trimethyl ammonium bromide, halide salts of quarternized polyoxyethylalkylamines, and dodecylbenzyl triethyl ammonium chlorides. "Surfactant" also refers to non-reactive, non-polymerizable nonionic surfactants such as polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, and block copolymer of polyethylene oxide and polypropylene oxide. Thus, the monomer emulsion may be free of (i.e., does not comprise) any of these surfactants.

Processing steps for forming the resin particles may comprise adding any of the monomer emulsions described above to a reactive surfactant solution at a feed rate over a period of time. The reactive surfactant solution comprises a solvent and a reactive surfactant. Any of the solvents and any of the reactive surfactants described above may be used. One type or different types of solvent and/or reactive surfactants may be used. The reactive surfactant in the reactive surfactant solution may be the same type or a different type as compared to a reactive surfactant that may be present in the monomer emulsion. The reactive surfactant solution may further comprise a buffer. Various buffers may be used such as sodium bicarbonate, sodium carbonate, and ammonium hydroxide. The reactive surfactant may be used in an amount in a range of from 1 weight % to 10 weight %. (Here, weight % refers to the (total weight of reactive surfactants)/(total weight of reactive surfactant solution)*100.) This range includes from 2 weight % to 5 weight %. The buffer may be used in an amount in a range of from 0.25 weight % to 2.5 weight %. (Weight % has a meaning analogous to that described above.)

An initiator may be included in the reactive surfactant solution. Alternatively, a separate initiator solution comprising the initiator and any of the solvents described above may be formed and the separate initiator solution added to the reactive surfactant solution. The separate initiator solution may be added prior to the addition of the monomer emulsion. An additional amount of a separate initiator solution may be added after the addition of the monomer emulsion. One type or different types of solvent and/or initiators may be used. Examples of suitable initiators include water soluble initiators, such as ammonium persulfate (APS), sodium persulfate and potassium persulfate; and organic soluble initiators including organic peroxides and azo compounds including Vazo peroxides, such as VAZO 64™, 2-methyl 2-2'-azobis propanenitrile, VAZO 88™ 2-2'-azobis isobutyramide dehydrate; and combinations thereof. Other water-soluble initiators which may be used include azoamidine compounds, for example 2,2'-azobis(2-methyl-N-phenylpropionamidine) dihydrochloride, 2,2'-azobis[N-(4-chlorophenyl)-2-methylpropionamidine]di-hydrochloride, 2,2'-azobis[N-(4-hydroxyphenyl)-2-methyl-propionamidine] dihydrochloride, 2,2'-azobis[N-(4-amino-phenyl)-2-methylpropionamidine]tetrahydrochloride, 2,2'-azobis[2-methyl-N-(phenylmethyl)propionamidine]dihydrochloride, 2,2'-azobis[2-methyl-N-2-propenylpropionamidine]dihydrochloride, 2,2'-azobis[N-(2-hydroxy-ethyl)2-methylpropionamidine]dihydrochloride, 2,2'-azobis[2(5-methyl-2-imidazolin-2-yl)propane]dihydrochloride, 2,2'-azobis[2-(2-imidazolin-2-yl)propane]dihydrochloride, 2,2'-azobis[2-(4, 5,6,7-tetrahydro-1H-1,3-diazepin-2-yl)propane] dihydrochloride, 2,2'-azobis[2-(3,4,5,6-tetrahydropyrimidin-2-yl)propane]dihydrochlo-ride, 2,2'-azobis[2-(5-hydroxy-3,4,5,6-tetrahydropyrimidin-2-yl) propane]di-hydrochloride, 2,2'-azobis {[1-(2-hydroxyethyl)-2-imidazolin-2-yl]propane}dihydrochloride, and combinations thereof. The initiator may be used in an amount in a range of from 0.1 weight % to 2.5 weight %. (Here, weight % refers to the (total weight of initiators)/(total weight of reactive surfactant solution)*100.)

Silica nanoparticles may be included in the reactive surfactant solution. Silica nanoparticles may become bound to hydrogen bonding moieties of the hydrophilic monomers and/or water molecules bound to the hydrogen bonding moieties. The use of silica nanoparticles is beneficial, at least in part, since a smaller amount of a non-silica white pigment (e.g., titanium dioxide) may then be used in the aqueous inkjet ink composition. Rather than including the silica nanoparticles during the polymerization process, the silica nanoparticles may be included as an additive when making the aqueous inkjet ink composition as described below.

The size of the silica nanoparticles used is generally quite small, e.g., silica nanoparticles having a $D_{50}$ particle size of no greater than 100 nm, no greater than 50 nm, or in a range of from 5 nm to 50 nm may be used. Silica nanoparticles may be included in the reactive surfactant solution at an amount in a range of from 0.5 weight % to 5 weight %. (Here, weight % refers to the total weight of silica nanoparticles)/(total weight of reactive surfactant solution)*100. The total weight of silica nanoparticles refers to solid weight, rather than the weight of a silica nanoparticle dispersion/solution. Commercially available silica nanoparticles which may be used include the following: various grades of LUDOX Colloidal Silica such as FM, SM, HS-30, HS-40, LS, TM-40, TM-50, SM-AS, AS-30, AS-40, AM, HSA, TMA, P X-30, P t-40, P W-50, CL, and CL-P; and various grades of Nissan Chemical Silica such as SNOWTEX ST-20L, ST-30, ST-40, ST-50, ST-OS, ST-O, ST-O-40, ST-OL, ST-C, ST-C-30, ST-CM, ST-N, STN30G, ST-N40, ST-NS, ST-XS, ST-S, ST-UP, ST-O-UP, MA-ST-UP, ST-PS-S, AMT-3305, HX-305M1, and HX-305M5.

In embodiments, the reactive surfactant solution comprises (or consists of) a solvent (e.g., water), a reactive surfactant, and optionally, one or more of an initiator, a buffer, and silica nanoparticles. In such embodiments, one type or different types of these components may be used. In any of these embodiments, amounts of the reactive surfactants, initiator, buffer, and silica nanoparticles may be used as described above. The balance may be made up of the solvent. At least in some embodiments, the reactive surfactant solution is free of (i.e., does not comprise) any of the surfactants described above. In at least some embodiments, the reactive surfactant solution is free of (i.e., does not comprise) any monomers, other than the reactive surfactant monomer(s) present in the solution.

The addition of the monomer emulsion to the reactive surfactant solution may be carried out under an inert gas (e.g., nitrogen) and at an elevated temperature (e.g., greater than room temperature such as a temperature in a range of from 50° C. to 90° C.). This may be accomplished by purging with the inert gas and heating the reactive surfactant solution prior to the addition of the monomer emulsion and continuing during the addition of the monomer emulsion.

As noted above, the monomer emulsion may be added at a feed rate over a period of time. In the presence of the initiator, the monomers of the monomer emulsion undergo polymerization reactions to form the resin particles of the latex. The feed rate is generally sufficiently slow so that the polymerization is carried out under "monomer-starved" conditions. This means that the feed rate is no greater than the rate the polymerization reactions, e.g., between styrene and acrylate monomers. Illustrative feed rates include those in a range of from 1 mL/min to 10 mL/min based on a total reaction volume of 1 L. Illustrative periods of time include those in a range of from 60 minutes to 600 minutes. After the monomer emulsion has been added, the polymerization may be allowed to continue for an additional period of time, with or without the addition of additional initiator. Illustrative additional periods of time include those in a range of from 1 hour to 18 hours. Both the addition of the monomer emulsion and the polymerization after addition may be carried out under the inert gas and at the elevated temperature. The result of the processing steps described above is a latex comprising the resin particles. The latex may be used as is, or may be processed by standard techniques such as coagulation, dissolution and precipitation, filtering, washing, or drying.

In embodiments, the methods for forming the resin particles do not involve the use of a resin seed in forming the resin particles. In such embodiments, neither the monomer emulsion nor the reactive surfactant solution comprises such a resin seed. The polymerization reactions that form the resin particles also do not involve such a resin seed. Similarly, at least in embodiments, the present methods do not involve the use of any of the surfactants (other than the reactive surfactant monomers) described above. In other embodiments, the methods for forming the resin particles may make use of a resin seed, e.g., in order to initiate and stabilize polymerization.

The methods may further comprise forming the monomer emulsion, forming the reactive surfactant solution, and/or forming the initiator solution. Each may be formed by combining the desired components at the desired amounts and mixing.

The composition of the resin particles depends upon the selection of the monomers and their relative amounts, as well as the polymerization reactions between selected monomers that produce a polymerization product as described above. Thus, a variety of compositions are encompassed, including those based on various polymerization products of reactants comprising various combinations of monomers. As noted above, the selection of monomers is not particularly limited. However, in embodiments, the resin particles comprise (or consist of) the polymerization product (e.g., a copolymer) of reactants comprising a styrene, an alkyl acrylate (e.g., butyl acrylate), an acidic monomer, a hydrophilic monomer, a multifunctional monomer (e.g., a difunctional monomer), and a reactive surfactant. In such embodiments, one type or different types of the various monomers may be present. In embodiments, the resin particles comprise (or consist of) the polymerization product of reactants comprising a styrene, an alkyl acrylate (e.g., butyl acrylate), two different types of acidic monomers (e.g., a methacrylic acid and a sulfonic acid), a hydrophilic monomer (e.g., hydroxyethyl acrylate), a difunctional monomer (e.g., a poly(ethylene glycol) diacrylate), and a reactive surfactant. In each of these embodiments, an initiator may be incorporated at the beginning and end of each polymer chain in the resin particles. In each of these embodiments, the resin may be crosslinked due to the multifunctional/difunctional monomer. In each of these embodiments, the monomers may be present in the resin particles in the amounts described above. For example, together, the amount of the acidic monomer, the hydrophilic monomer, and the multifunctional monomer, may be in a range of from 10 weight % to 30 weight % in the resin particles. As above, this weight % refers to the (total weight of acidic monomers, hydrophilic monomers, and multifunctional monomers)/(total weight of monomers in the resin particles, excluding the reactive surfactants)*100.

The resin particles may be characterized by their size and size distribution. The resin particles may have a relatively small size and narrow size distribution. The size of the resin particles may be reported as a $D_{(z,\ ave)}$ value, measured using a nanoparticle analyzer such as a Malvern Nano-Zetasizer. In embodiments, the $D_{(z,\ ave)}$ is than no greater 200 nm, no greater than 190 nm, no greater than 180 nm, no greater than 170 nm, or in a range of from 80 nm to 200 nm. The size distribution may be reported as a polydispersity index (PDI), measured using a nanoparticle analyzer such as a Malvern Nano-ZS. In embodiments, the PDI is no greater than 0.1, no greater than 0.050, no greater than 0.040, no greater than 0.035, no greater than 0.030 or in a range of from 0.001 to 0.1.

Due to their small size and narrow size distribution, the resin particles may further be characterized as being free of (i.e., not comprising) large particles. This may be evidenced by a $D_{(v,\ 90)}$ value of less than 200 nm, less than 175 nm, or less than 150 nm.

The small size and narrow size distribution of the resin particles may be further evidenced by the ability to form of three-dimensional (3D) photonic crystals upon removal of solvent (i.e., drying) from a latex comprising the resin particles. Such crystal formation is possible because of the uniform size distribution of the resin particles. Local crystallization and the ability to form the 3D photonic crystals may be confirmed using scanning tunneling electron microscopy (STEM). Controlled heating may be used to achieve the 3D photonic crystals.

The resin particles may be present in the aqueous inkjet ink composition in various amounts, including an amount in a range of from 1 weight % to 10 weight %. (Here, weight % refers to the (total weight of resin particles)/(total weight of aqueous inkjet ink composition)*100.) This range includes from 1 weight % to 6 weight %. Although combinations of different types of resin particles may be used, in embodiments, the aqueous inkjet ink composition comprises a single type of the resin particles.

Colorant

In addition to the white pigment, the aqueous inkjet ink composition may comprise a colorant. Colorants include pigments, dyes, and combinations thereof. Examples of suitable dyes include anionic dyes, cationic dyes, nonionic dyes, and zwitterionic dyes. Specific examples of suitable dyes include Food dyes such as Food Black No. 1, Food Black No. 2, Food Red No. 40, Food Blue No. 1, Food Yellow No. 7, FD & C dyes, Acid Black dyes (No. 1, 7, 9, 24, 26, 48, 52, 58, 60, 61, 63, 92, 107, 109, 118, 119, 131, 140, 155, 156, 172, 194), Acid Red dyes (No. 1, 8, 32, 35, 37, 52, 57, 92, 115, 119, 154, 249, 254, 256), Acid Blue dyes (No. 1, 7, 9, 25, 40, 45, 62, 78, 80, 92, 102, 104, 113, 117, 127, 158, 175, 183, 193, 209), Acid Yellow dyes (No. 3, 7, 17, 19, 23, 25, 29, 38, 42, 49, 59, 61, 72, 73, 114, 128, 151), Direct Black dyes (No. 4, 14, 17, 22, 27, 38, 51, 112, 117, 154, 168), Direct Blue dyes (No. 1, 6, 8, 14, 15, 25, 71, 76, 78, 80, 86, 90, 106, 108, 123, 163, 165, 199, 226), Direct Red dyes (No. 1, 2, 16, 23, 24, 28, 39, 62, 72, 236), Direct Yellow dyes (No. 4, 11, 12, 27, 28, 33, 34, 39, 50, 58, 86, 100, 106, 107, 118, 127, 132, 142, 157), Reactive Dyes, such as Reactive Red Dyes (No. 4, 31, 56, 180), Reactive Black dyes (No. 31), Reactive Yellow dyes (No. 37); anthraquinone dyes, monoazo dyes, disazo dyes, phthalocyanine derivatives, including various phthalocyanine sulfonate salts, aza(18)annulenes, formazan copper complexes, and triphenodioxazines.

Examples of suitable pigments include black pigments, cyan pigments, magenta pigments, and yellow pigments. Pigments can be organic or inorganic particles. Suitable inorganic pigments include carbon black. However, other inorganic pigments may be suitable such ascobalt blue ($CoO—Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitro pigments, nitroso pigments, and anthanthrone pigments such as PR168. Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation. Examples of black pigments that may be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company. Suitable carbon black pigments include, without limitation, Cabot pigments such as MONARCH® 1400, MONARCH® 1300, MONARCH® 1100, MONARCH® 1000, MONARCH® 900, MONARCH® 880, MONARCH® 800, MONARCH® 700, CAB-O-JET® 200, CAB-O-JET® 300, CAB-O-JET® 450, REGAL®, BLACK PEARLS®, ELFTEX®, MOGUL®, and VULCAN® pigments; Columbian pigments such as RAVEN® 5000, and RAVEN® 3500; Evonik pigments such as Color Black FW 200, FW 2, FW 2V, FW 1, FW18, FW 5160, FW 5170, Special Black 6, Special Black 5, Special Black 4A, Special Black 4, PRINTEX® U, PRINTEX® 140U, PRINTEX® V, and PRINTEX® 140V. Other pigments include CAB-O-JET 352K, CAB-O-JET 250C, CAB-O-JET 260M, CAB-O-JET 270Y, CAB-O-JET 465M, CAB-O-JET 470Y and CAB-O-JET 480V (available from Cabot Corporation).

If used, the colorant may be present in the aqueous inkjet ink composition at various amounts. In embodiments, the colorant is present at an amount in the range of from 0.01 weight % to 5 weight % as compared to the total weight of the aqueous inkjet ink composition. This includes from 0.01 weight % to 2 weight % and from 0.01 weight % to 1 weight %. If more than one type of colorant is used, these amounts refer to the total amount of colorant. These amounts refer to solids content as opposed to the amount of a dispersion comprising the colorant.

In embodiments, in addition to the white pigment, the aqueous inkjet ink composition comprises a black colorant, a cyan colorant, or combinations thereof. Inclusion of such colorants in the white-pigment containing aqueous inkjet ink compositions is useful to provide grey aqueous inkjet ink compositions. In embodiments, the colorants in the aqueous inkjet ink compositions consist of the white pigment, and optionally, one or more of a black colorant and a cyan colorant. In such embodiments, any of the white pigments, black colorants, and cyan colorants described above may be used. Any of the amounts for the white pigment, black colorant, and cyan colorant described above may be used.

Wax

The aqueous inkjet ink composition may comprise a wax. Illustrative waxes include paraffin waxes, polyethylene waxes, polypropylene waxes, microcrystalline waxes, polyolefin waxes, montan based ester waxes and carnauba waxes. Waxes having a melting point in a range of from 50° C. to 150° C. may be used. Nanoscale (e.g., diameter of 1000 nm or less, 500 nm or less, or 100 nm or less) wax emulsions based on carnauba wax and paraffin wax may be used. Waxes such as those from Michelman may be used (e.g., Michem Lube 103DI, 124, 124P135, 156, 180, 182, 190, 270R, 368, 511, 693, 723, 743, 743P, and 985; and Michem Emulsion 24414, 34935, 36840, 41740, 43040, 43240, 44730, 47950, 48040M2, 61355, 62330, 66035, 67235, 70750, 71150, 71152, 91735, 93235, 93335, 93935, and 94340). Waxes from Byk may also be used, including Aquacer 2500, Aquacer 507, Aquacer 513, Aquacer 530, Aquacer 531, Aquacer 532, Aquacer 535, Aquacer 537, Aquacer 539, and Aquacer 593.

It has been found that nanoscale wax emulsions based on charged waxes (e.g., anionic waxes) are particularly useful. An illustrative such wax is Michem Lube 190.

If used, the wax may be present in the aqueous inkjet ink compositions at various amounts. In embodiments, the amount is in a range of from 0.1 weight % to 5 weight % as compared to the total weight of the aqueous inkjet ink composition. If more than one type of wax is used, these amounts refer to the total amount of wax. These amounts refer to solids content as opposed to the amount of a dispersion comprising the wax.

Surfactant

The aqueous inkjet ink compositions may comprise a surfactant. Examples of suitable surfactants include anionic surfactants (such as sodium lauryl sulfate (SLS), Dextrol OC-40, Strodex PK 90, ammonium lauryl sulfate, potassium lauryl sulfate, sodium myreth sulfate and sodium dioctyl sulfosuccinate series), nonionic surfactants (Surfynol® 104 series, Surfynol® 400 series, Dynol™ 604, Dynol™ 607, Dynol™ 810, EnviroGem® 360, secondary alcohol ethoxylate series such as Tergitol™ 15-s-7, Tergitol™ 15-s-9, TMN-6, TMN-100x and Tergitol™ NP-9, Triton™ X-100, etc.) and cationic surfactants (Chemguard S-106A, Chemguard S-208M, Chemguard S-216M). Some fluorinated or silicone surfactants can be used such as PolyFox™ TMPF-136A, 156A, 151N, Chemguard S-761p, S-764p, Silsurf® A008, Siltec® C-408, BYK 345, 346, 347, 348 and 349, 3410, 333, 3455, 342, 333, 302, polyether siloxane copolymer TECO® Wet-260, 270 500, etc, and TEGO® Tween 4000 Some amphoteric fluorinated surfactants can also be used such as alkyl betaine fluorosurfactant or alkyl amine oxide fluorosurfactant such as Chemguard S-500 and Chemguard S-111.

If used, the surfactant may be present in the aqueous inkjet ink composition at various amounts. In embodiments, the surfactant is present in an amount in a range of from 0.01 weight % to 2 weight % as compared to the total weight of the aqueous inkjet ink composition. If more than one type of surfactant is used, these amounts refer to the total amount of surfactant.

Other Resins, Emulsions, Binders, Dispersants

Although not required, the aqueous inkjet ink compositions may comprise a water-soluble resin or emulsion, a water-borne binder, a polymeric dispersant, or combinations thereof. A variety of water-soluble resins may be used such as polyethylene glycol and polyvinylpyrrolidone. A polyethylene glycol having a molecular weight in a range of from 3000 g/mol to 9000 g/mol, from 3000 g/mol to 7000 g/mol, from 3000 g/mol to 5000 g/mol, or 4000 g/mol may be used. These molecular weights may be measured using gel permeation chromatography.

Exemplary water-borne binders include Rhoplex I-1955, Rhoplex I-2426D, Rhoplex I-62, Rhoplex I-98, Rhoplex E-1691, available from Rhohm & Haas. Others include Lucidene 190, Lucidene 400, and Lucidene 243, available from DSM Corporation; NeoCryl A-1110, NeoCryl A-2092, NeoCryl A-639, NeoRad R-440, NeoRad R-441, NeoRez N-55 under the name 972, PVP K-15, PVP K-30, PVP K-60, PVP K-85, Ganex P-904LC, PVP/VA W-63 available from ISP. Other exemplary water-borne binders include those available from Johnson Polymers (BASF) such as Joncryl 537, Joncryl H538, Joncryl H538.

Polymeric dispersants which may be used include acrylic polymers such as styrene-acrylic copolymers and vinylpyrrolidone copolymers, urethane or polyurethane dispersions, and acrylic-urethane hybrid dispersions. More specific polymeric dispersants include those available from Johnson Polymers (BASF) such as Joncryl® 671, Joncryl® 683, Joncryl® 296, Joncryl® 690, Joncryl HPD 296, Joncryl HPD96-E, Joncryl LMV 7085, Joncryl 8082, Other dispersants which may be used include those described in EP Patent No. 2097265, which is incorporated by reference for purposes of the dispersants, and those described in U.S. Patent Application No. 2019284414, which is incorporated by reference for purposes of the dispersants.

If present, various amounts of the components above may be used in the aqueous inkjet ink composition. In embodiments, the resin/emulsion/binder/dispersant is present in an amount in a range of from 0.01 weight % to 5 weight % as compared to the total weight of the aqueous inkjet ink composition. If combinations are used, or more than one type of a kind are used, these amounts refer to the total amount of resin/emulsion/binder/dispersant.

At least in embodiments, however, the aqueous inkjet ink compositions are free of (i.e., do not comprise) a water-soluble resin or emulsion. Similarly, in embodiments, the aqueous inkjet ink compositions are free of (i.e., do not comprise) a water-borne binder. Similarly, in embodiments, the aqueous inkjet ink compositions are free of (i.e., do not comprise) a polymeric dispersant. This means being free of (i.e., not comprising) any of the water-soluble resins or emulsions, water borne binders, and polymeric dispersants described above. None of the terms water-soluble resin, water-soluble emulsion, water-borne binder, and polymeric dispersant encompasses the resin particles in the present aqueous inkjet ink compositions.

Additives

Various additives may be used in the aqueous inkjet ink compositions to tune the properties thereof. Suitable additives include one or more of biocides; fungicides; stabilizers; pH controlling agents such as acids or bases, phosphate salts, carboxylates salts, sulfite salts, amine salts, buffer solutions; sequestering agents such as EDTA (ethylenediamine tetra acetic acid); humectants; defoamers; wetting agents; and the silica nanoparticles described above (e.g., if not already included during monomer polymerization).

Various amounts of the additives may be used in the aqueous inkjet ink compositions. In embodiments, the additives are present in an amount in a range of from 0.01 weight % to 5 weight % as compared to the total weight of the aqueous inkjet ink composition. If more than one type of additive is used, these amounts refer to the total amount of additives.

In at least embodiments, the present aqueous inkjet ink compositions are free of (i.e., do not comprise) a coagulant and are free of (i.e., do not comprise) a coalescing agent and are free of (i.e., do not comprise) a plasticizer. In embodiments, the ink compositions are free of (i.e., do not comprise) any pyrrolidone-based solvents such as N-methylpyrrolidone, and are free of (i.e., do not comprise) Texanol and Texanol isobutyrate.

In embodiments, the aqueous inkjet ink composition comprises (or consists of) a solvent system; a white pigment; resin particles; and optionally, one or more of a colorant, a wax, and an additive. In embodiments, the aqueous inkjet ink composition comprises (or consists of) a solvent system; a white pigment; resin particles; a wax; and optionally, one or more of a colorant and an additive. In embodiments, the solvent system consists of water, a first organic solvent, and a second organic solvent. In embodiments, the colorant may be present and may be selected from a black colorant, a cyan colorant, and combinations thereof. In embodiments, the additives may be selected from a stabilizer, a surfactant, a defoamer, a wetting agent, a humectant, and a biocide. In any of these embodiments, the components may be selected from any of the solvent systems, organic solvents, resin particles, white pigments, colorants, waxes, and additives disclosed herein. In any of these embodiments, amounts of the components may be used as disclosed herein.

The aqueous inkjet ink compositions may be formed by combining the desired components at the desired amounts and mixing. An illustrative method comprises adding the white pigment (which may be provided as a dispersion) to water; adding the resin particles (which may be provided as a latex) to the water; adding the organic solvent(s) to the water; and adding any additives to the water. The organic solvent(s) and any additives may be combined together as a separate mixture before adding to the water. If a wax (which may be provided as a dispersion) is to be included, it may be added separately. The wax may be added after the addition of the organic solvents and additives. If a colorant is to be included, it has been determined that the colloidal stability of the aqueous inkjet ink composition is highly sensitive to the order of addition of the colorant. These results are demonstrated in the Examples, below. Specifically, any colorants (which may be added as separate or combined dispersion) are desirably added before addition of the white pigment. Mixing and/or heating may be used during the method. The aqueous inkjet ink composition may be filtered prior to use.

Properties

The aqueous inkjet ink compositions may be characterized by their viscosities. The viscosity may be a mean shear viscosity as measured over a range of from 4 to 400 Hz and a temperature of 37° C. The mean shear viscosity may be measured using an ARES-G2 rheometer by TA Instruments. The number of measurements to provide the mean value may be 10. The mean shear viscosity values may refer to the aqueous inkjet ink composition having a white pigment solids content in a range of from 4 weight % to 15 weight % as compared to the total weight of the aqueous inkjet ink composition. In embodiments, the mean shear viscosity is in a range of from 1 mPa·s to 8 mPa·s, 2 mPa·s to 7 mPa·s, or 3 mPa·s to 6 mPa·s. These viscosities are all initial viscosities, measured within a day after formation of the aqueous inkjet ink compositions.

As noted above, embodiments of the aqueous inkjet ink compositions exhibit high long-term colloidal stability. As described in the Examples, below, mean shear viscosity provides a measurement of the colloidal stability of the aqueous inkjet ink compositions. Embodiments of the aqueous inkjet ink compositions exhibit mean shear viscosities that are very stable over extended periods of time and elevated temperatures. Specifically, embodiments of the aqueous inkjet ink compositions exhibit mean shear viscosities after a period of 3 days at 60° C. that are within 5% or less of the respective initial mean shear viscosity. Embodiments of the aqueous inkjet ink compositions exhibit mean shear viscosities after a period of 6 days at 60° C. that are within 5% or less of the respective initial mean shear viscosity. As demonstrated in the Examples, below, it has been found that the stability of the mean shear viscosity, and thus, the stability of the colloidal dispersion, is highly sensitive to the second organic solvent in the aqueous inkjet ink compositions. For aqueous inkjet ink compositions comprising one or more colorants in addition to the white pigment (e.g., grey aqueous inkjet ink compositions), the stability is also highly sensitive to the order of addition of the colorants/white pigment.

The aqueous inkjet ink compositions may be used to form printed images. In embodiments, such a method comprises ejecting droplets of any of the disclosed aqueous inkjet ink compositions onto a substrate to form an image thereon. Such a method may further comprise incorporating the ink composition into an inkjet printing apparatus. The printing apparatus may employ a thermal inkjet process wherein the ink composition in the nozzles is selectively heated in an imagewise pattern, thereby causing droplets of the ink composition to be ejected in imagewise pattern. Alternatively, the printing apparatus may employ an acoustic inkjet process wherein droplets of the ink composition are caused to be ejected in imagewise pattern by acoustic beams. In yet another embodiment, the printing apparatus may employ a piezoelectric inkjet process, wherein droplets of the ink composition are caused to be ejected in imagewise pattern by oscillations of piezoelectric vibrating elements. Any suitable substrate can be employed.

The method may comprise ejecting ink droplets in an imagewise pattern onto an intermediate transfer member, heating the image to partially or completely remove solvents, and transferring the ink composition in the imagewise pattern from the intermediate transfer member to a final recording substrate. The intermediate transfer member may be heated to a temperature above that of the final recording sheet and below that of the ink composition in the printing apparatus. An offset or indirect printing process is also disclosed in, for example, U.S. Pat. No. 5,389,958, the disclosure of which is totally incorporated herein by reference.

Any suitable substrate or recording sheet can be employed as the final recording sheet. Illustrative substrates include McCoy® Gloss #100 coated substrate, Xerox® Bold uncoated substrate, Kodak photo paper, Sterling® Ultra Web Matte (offset coated), TrueJet® Gloss Text (Inkjet treated coated), and McCoy® Silk (offset coated). Other substrates are provided in the Examples, below.

EXAMPLES

The following Examples are being submitted to further define various species of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

Example 1: Latex

A reactive surfactant solution of 1.4 grams (Hitenol BC 1025 from Montello), 36 grams deionized water, and 0.7 g of a silica nanoparticle solution (Ludox TMA at 34%) was prepared by mixing in a glass reactor. The reaction was then purged with nitrogen for 30 minutes. The reactor was then continuously purged with nitrogen while being stirred at 250 rpm. The reactor was then heated up to about 75° C. and held there. Separately, 0.3 grams of ammonium persulfate (APS) initiator was dissolved in 5 grams of deionized water and added to the reactor.

Separately, a monomer emulsion was prepared in the following manner: 28 g of styrene, 6 g of butyl acrylate, 3 g of methacrylic acid, 1 g of sodium 4-styrenesulfonate (styrenesulfonic acid), 1 g of hydroxyethyl acrylate (HEA), 0.6 g of 1-dodecanethiol (DDT), 0.2 g of PEGDA 250, 0.8 g of Hitenol BC 1025, and 16 g of deionized water were mixed to form an emulsion. The emulsified mixture was fed to the reactor slowly for about 2 h and the reaction continued for about 1.5 h. An additional 0.1 g of APS initiator was dissolved in deionized water and added to the reactor over about 10 minutes and the reaction continued for an additional about 1.5 hours. The resulting latex was cooled to room temperature and neutralized to pH 8.0 with 0.5 M KOH solution.

The conversion of the monomers was measured and shown to be above 99.9% conversion. Thus, the weight of monomers in the monomer emulsion are same as in the resin particles, excluding the polymerizable surfactant from the calculation.

Example 2: White Aqueous Inkjet Ink Composition

White aqueous inkjet ink compositions were formed using the latex of Example 1. The following steps were used to form the aqueous inkjet ink compositions and the formulations are shown in Table 1:
1. A titanium oxide dispersion was added to deionized water and mixed for about 15 minutes at a speed of about 650 RPM, using a cowls blade impeller.
2. The latex with resin particles (Example 1) was added slowly to the titanium oxide dispersion and mixed for about 20 minutes (Mixture A).
3. In a separate beaker, the solvents, humectant, stabilizer, defoamer, surfactant, and wetting agent were mixed to form a homogenous mixture (Mixture B).
4. Mixture B was slowly added into Mixture A. Once the addition was complete, the components were allowed to mix for about 20 minutes.
5. The wax was added and mixing continued for about 15 minutes.
6. After mixing, the aqueous inkjet ink composition was left at room temperature for about 60 minutes before checking pH, conductivity and surface tension Example 4: Grey Aqueous Inkjet Ink Compositions A first process (Process I) was used to form grey aqueous inkjet ink compositions. The steps were as follows:

Process I
1. Addition of titanium oxide to water being mixed at about 650 rpm.
2. Addition of black dispersion to the mixture in step 1.
3. Addition of cyan dispersion to the mixture in step 2.
3. Addition of latex with resin particles (Example 1) to mixture in step 3.
4. Allowing the mixture to be agitated for about 25-30 minutes.
5. Prepare mixture of solvents and additives (Mixture B in Example 1).
6. Once the addition of mixture B to A was completed at about 650 rpm, the mixing speed ramped down to about 500 rpm and the mixture was agitated for about 50-55 minutes.
7. Addition of wax dispersion to the solution in step 7 at about 400 rpm and mixing for about 20 minutes.

The grey aqueous inkjet ink composition prepared via Process I suffered from stability issues as evidenced by visible particle formation. The extent of particle formation was so high that the composition could not be flowed through a 1-micron filter.

In order to mitigate the stability issues associated with Process I, a modified process was developed:

Process II
1. Addition of black dispersion to water.
2. Addition of cyan dispersion to mixture in step 1.
3. Addition of titanium oxide dispersion to mixture in step 2.
4. Addition of latex with resin particles (Example 1) to mixture in step 3.
5. Follow steps 4-7 in Process I.

The grey aqueous inkjet ink composition prepared via Process II flew through the 1-micron filter easily and jetted without any clogging or latency issues. A representative formulation is shown in Table 2.

TABLE 1

White Aqueous Inkjet Ink Formulations

| Component | Chemical | Weight % | Solids (weight %) (except for 1,2-hexandiol) | | | | | | |
|---|---|---|---|---|---|---|---|---|---|
| | | | A | B | C | D | E | F | G |
| Solvent | Water | 34 | | | | | | | |
| White Pigment | Titanium (IV) Oxide (40% solids) | Variable | 4 | 6 | 8 | 8 | 8 | 11.5 | 15 |
| Latex | Latex (28.2% solids) | 15.8 | 4.47 | 4.47 | 4.47 | 4.47 | 4.47 | 4.47 | 4.47 |
| First Organic Solvent | Propylene glycol | 28.5 | | | | | | | |
| Second Organic Solvent | 1,2-hexanediol | Variable | 7 | 7 | 5 | 3.5 | 0 | 4.5 | 4.05 |
| Humectant | Glycerol | 2 | | | | | | | |
| Stabilizer | Triethanolamine | 0.2 | | | | | | | |
| Defoamer | BYK024 | 0.25 | | | | | | | |
| Surfactant | Silicone (Byk 349) | 0.5 | | | | | | | |
| Wetting Agent | Multifunctional nonionic surfactant Surfynol AD01 | 0.25 | | | | | | | |
| Wax | Michem Lube 190 (35% solids) | 1.5 | 0.525 | 0.525 | 0.525 | 0.525 | 0.525 | 0.525 | 0.525 |
| Total % | | 100 | 9 | 11 | 13 | 13 | 13 | 16.5 | 20 |

TABLE 2

Grey Aqueous Inkjet Ink Composition.

| Component | Chemical | Weight % | Solids (%) |
|---|---|---|---|
| Solvent | Water | 31.4 | |
| White Pigment | Titanium (IV) Oxide | 6.3 | |
| Cyan Pigment | Cab-o-Jet 325 K (15% solids) | 0.9 | 0.135 |
| Black Pigment | Cab-o-Jet 450 K (15% solids) | 0.1 | 0.015 |
| Latex | Latex (27.47% solids) | 19 | 2.52 |
| First Organic Solvent | Propylene glycol | 33 | 5.22 |
| Second Organic Solvent | 1,2-hexanediol | 3 | |
| Humectant | Glycerol | 3.9 | |
| Stabilizer | Triethanolamine | 0.3 | |
| Defoamer | BYK024 | 0.1 | |
| Surfactant | Silicone (Byk 349) | 0.6 | |
| Wetting Agent | Multifunctional nonionic surfactant Surfynol AD01 | 0.25 | |
| Wax | Michem Lube 190 (35% solids) | 1 | 0.35 |
| Total % | | 100 | 8.24 |

Colloidal Stability

To test the colloidal stability of the aqueous inkjet ink compositions, the white aqueous inkjet ink compositions were aged either three days (±12 hours) in an about 60° C. (e.g., ±5° C.) oven or six days (±12 hours) in an about 60° C. (e.g., ±5° C.) oven for an accelerated aging study. Rheology and particle size were measured before and after aging. The mean shear viscosity was measured using ARES-G2 rheometer by TA Instruments at 37° C. and over the range of 4 to 400 Hz. The reported values were averages of 10 measurements. It was determined that the rheology measurement was a more accurate indicator of colloidal stability as compared to particle size measurements as it is sensitive to structure formation, gelling, coagulation, or precipitation during the ink aging. Table 3, below shows the result for white inks A-G of Table 1. In Table 3, the first measurement for each ink A-G is an initial mean shear viscosity for the ink, measured within a day of preparation of the ink. The % change in viscosity is given by the (magnitude of the difference between the initial mean shear viscosity value and the aged mean shear viscosity value)/(initial mean shear viscosity value)*100. The results are striking for white inks C-G, exhibiting mean shear viscosity values that are the same (within 4% or less) after aging for 6 days at 60° C. as the initial mean shear viscosity values. These white inks contain no more than 5 weight % 1,2-hexanediol. White inks A and B contain 7 weight % 1,2-hexanediol.

TABLE 3

Colloidal Stability Results for White Aqueous Inkjet Ink Compositions A-G.

| White Ink | Mean Shear Viscosity (mPa · s) | % change in viscosity | $D_{(z, ave)}$ (nm) |
|---|---|---|---|
| A | 4.31 | — | 172 |
| A, aged 3 d @ 60° C. | 7.93 | 84 | 178 |
| B | 5.05 | — | 185 |
| B, aged 3 d @ 60° C. | 8.95 | 77 | 184 |
| C | 4.91 | — | 185 |
| C, aged 3 d @ 60° C. | 5.07 | 3 | 186 |
| C, aged 6 d @ 60° C. | 5.03 | 2 | — |
| D | 4.42 | — | 190 |
| D, aged 3 d @ 60° C. | 4.54 | 3 | 182 |
| D, aged 6 d @ 60° C. | 4.49 | 2 | — |
| E | 3.71 | — | 185 |
| E, aged 3 d @ 60° C. | 3.63 | 2 | 189 |
| E, aged 6 d @ 60° C. | 3.71 | 0 | — |
| F | 5.21 | — | 186 |
| F, aged 3 d @ 60° C. | N.D. | — | 182 |
| F, aged 6 d @ 60° C. | 5.4 | 4 | — |
| G | 5.5 | — | 188 |
| G, aged 3 d @ 60° C. | N.D. | — | 183 |
| G, aged 6 d @ 60° C. | 5.61 | 2 | — |

Printing Performance

The aqueous inkjet ink compositions were jetted using a Dimatix DMP2800 printer on different paper substrates. A first set of test key parameters used were as follows: Drop mass=4.5-4.8 ng (i.e., about 4.5 ng), Drop velocity=6-7 m/s, frequency=5 kHz, voltage=16-20 V, printing temperature was 37° C. A second set of test key parameters used were as follows: Drop mass=8.5-9 ng (i.e., about 9 ng), Drop velocity=9-11 m/s, frequency=5 kHz, voltage=24-27 V, printing temperature was 37° C. The print parameter was a 600×600 dpi print. The measurement was done using a PIAS II instrument, which is a personal image analysis system with a digital loupe. The high-resolution optic module ~5 μm/pixel was used which has a field view of ~3.2 mm×2.4 mm to measure the dot size and diameter. The results are shown in Tables 4 (for White Inks C and G) and 5 (for Grey Ink).

TABLE 4

Printing Performance of White Inks C and G (about 9 ng drop mass).

| Ink | Substrate | # Layers | OD | L* | a* | b* |
|---|---|---|---|---|---|---|
| White Ink C | Melinex ST 505 | 1 | 0.72 | 51.43 | −1.56 | −8.23 |
| | | 2 | 0.57 | 59.45 | −1.87 | −8.39 |
| | Xerox transparency | 1 | 0.88 | 43.75 | −2.41 | −11.95 |
| | | 2 | 0.69 | 53.08 | −2.85 | −11.60 |
| White Ink G | Melinex ST 505 | 1 | 0.46 | 65.93 | −2.92 | −8.29 |
| | | 2 | 0.36 | 72.55 | −2.52 | −6.89 |
| | Xerox transparency | 1 | 0.62 | 56.91 | −3.22 | −10.15 |
| | | 2 | 0.40 | 69.96 | −2.80 | −6.35 |

White aqueous inkjet ink compositions C and G also exhibited exceptional water fastness. White ink C resisted more than 20 wet rubs and white ink G resisted more than 25 wet rubs. Wet rub resistance was measured using double-rubs of a wet Q-tip. A thin layer of each ink was coated on McCoy gloss #100 paper and then dried in a convection oven at 130° C. for 2 min.

Microscopy images were obtained for images printed using white aqueous inkjet ink compositions C and G. The images showed excellent dot circularity and homogeneity in the line width. The solid printed block for both white inks C and G displayed very smooth sides and edges, which is usually difficult to obtain in aqueous inkjet inks.

TABLE 5

Printing Performance of Grey Ink. Pantone reference measurements are also included.

| Ink | OD | L* | a* | b* | Diameter (µm) | Circularity | Graininess | Mottle | Line (mm) |
|---|---|---|---|---|---|---|---|---|---|
| 4.5 ng Grey Ink on McCoy Gloss | 0.17 | 85.81 | 2.05 | −1.83 | 36.07 | 0.93 | 3.00 | 0.90 | 0.04 |
| Pantone Swatch Cool Grey-1C | 0.18 | 85.25 | 0.25 | −1.14 | — | — | — | — | — |
| 9 ng Grey Ink on McCoy Gloss | 0.22 | 81.49 | 1.94 | −0.35 | 42.20 | 0.90 | 3.30 | 1.20 | 0.05 |
| Pantone Swatch Warm Grey-1C | 0.23 | 81.15 | 1.79 | 1.24 | — | — | — | — | — |

As noted above, the results from the characterization of the grey aqueous inkjet ink composition are summarized in Table 5. In this table, the reference measurements from Pantone swatch for cool grey and warm grey were also included. Results from 4.5 ng and 9 ng printing of the grey ink are in agreement with reference Pantone cool grey and warm grey. Also, the mottle, circularity, and graininess were within specifications.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. An aqueous inkjet ink composition comprising:
    a solvent system comprising water, a first organic solvent, and a second organic solvent, wherein the first organic solvent is an alkanediol having 2 or 3 carbon atoms and the first organics solvent is present at an amount of from about 28.5 weight % to about 40 weight %, further wherein the second organic solvent is an alkanediol having from 2 to 8 carbon atoms and the second organic solvent is present at an amount of from greater than 0 weight % to about 8 weight %;
    a white pigment; and
    resin particles comprising a polymerization product of reactants comprising a monomer, an acidic monomer, a hydrophilic monomer, a multifunctional monomer, and a reactive surfactant.

2. The aqueous inkjet ink composition of claim 1, wherein the amount of the second organic solvent is from about 2 weight% to about 6 weight %.

3. The aqueous inkjet ink composition of claim 1, wherein the second organic solvent is a linear alkanediol.

4. The aqueous inkjet ink composition of claim 3, wherein the second organic solvent is a hexanediol.

5. The aqueous inkjet ink composition of claim 4, wherein the hexanediol is 1,2-hexanediol.

6. The aqueous inkjet ink composition of claim 1, wherein the aqueous inkjet ink composition is free of each of a pyrrolidone, dipropylene glycol monomethyl ether, tetrahydrofurfuryl alcohol, propylene glycol monopropyl ether, and combinations thereof.

7. The aqueous inkjet ink composition of claim 1, wherein the first organic solvent is propylene glycol.

8. The aqueous inkjet ink composition of claim 1, wherein the white pigment is titanium dioxide.

9. The aqueous inkjet ink composition of claim 8, wherein the titanium dioxide is in the form of particles having a $D_{50}$ particle size of less than about 150 nm and the titanium dioxide is present at an amount in a range of from about 0.1 weight % to about 15 weight %.

10. The aqueous inkjet ink composition of claim 1, wherein the resin particles further comprise silica nanoparticles.

11. The aqueous inkjet ink composition of claim 1, further comprising a colorant selected from the group consisting of a black pigment, a cyan pigment, and combinations thereof.

12. The aqueous inkjet ink composition of claim 1, wherein the aqueous inkjet ink composition exhibits a mean shear viscosity after about 3 days at about 60° C. that is within about 5% or less of its initial mean shear viscosity; a mean shear viscosity after about 6 days at about 60° C. that is within about 5% or less of its initial mean shear viscosity; or both.

13. The aqueous inkjet ink composition of claim 1, wherein the aqueous inkjet ink composition is free of a water-soluble resin, a water-soluble emulsion, a water borne binder, and a polymeric dispersant.

14. The aqueous inkjet ink composition of claim 1, wherein the second organic solvent is present at an amount of from about 3 weight % to about 5 weight %.

15. The aqueous inkjet ink composition of claim 14, wherein the second organic solvent is 1,2-hexanediol.

16. The aqueous inkjet ink composition of claim 15, wherein the first organic solvent is propylene glycol.

17. The aqueous inkjet ink composition of claim 16, wherein the white pigment is titanium dioxide.

* * * * *